(12) United States Patent
Okada

(10) Patent No.: US 8,259,147 B2
(45) Date of Patent: Sep. 4, 2012

(54) IMAGE FORMING APPARATUS AND METHOD OF CONTROLLING THE SAME

(75) Inventor: Tomoyuki Okada, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 799 days.

(21) Appl. No.: 11/862,045

(22) Filed: Sep. 26, 2007

(65) Prior Publication Data

US 2008/0084469 A1 Apr. 10, 2008

(30) Foreign Application Priority Data

Oct. 4, 2006 (JP) .............................. 2006-272853
Aug. 22, 2007 (JP) .............................. 2007-216171

(51) Int. Cl.
*B41J 2/45* (2006.01)
*B41J 2/435* (2006.01)

(52) U.S. Cl. .................... 347/238; 347/237; 347/247

(58) Field of Classification Search .................. 347/238, 347/328, 237, 247
See application file for complete search history.

(56) References Cited

U.S. PATENT DOCUMENTS

| | | | | |
|---|---|---|---|---|
| 2004/0228374 A1* | 11/2004 | Inukai | .............................. | 372/31 |
| 2005/0062838 A1* | 3/2005 | Kudou | .......................... | 347/238 |
| 2005/0151831 A1* | 7/2005 | Katsuma | ...................... | 347/238 |
| 2007/0091164 A1* | 4/2007 | Jodra et al. | ..................... | 347/247 |

FOREIGN PATENT DOCUMENTS

| | | |
|---|---|---|
| JP | 05-212900 A | 8/1993 |
| JP | 2002-172817 A | 6/2002 |
| JP | 2004-347844 A | 12/2004 |
| JP | 2005-070069 A | 3/2005 |
| JP | 2005-262485 A | 9/2005 |
| JP | 2006-047549 A | 2/2006 |

* cited by examiner

Primary Examiner — Stephen Meier
Assistant Examiner — Sarah Al Hashimi
(74) Attorney, Agent, or Firm — Canon USA Inc IP Division

(57) ABSTRACT

An image forming apparatus in which a BD signal, which is a main-scanning reference signal, and image data are input to an image signal generating unit. Using a converting unit, main-scanning coordinate information, output from a main scanning coordinate measuring counter, and correction amounts, recorded in a correction amount LUT, are referred to, to convert a proper amount of image data. Here, the converting unit performs calculations in accordance with the main-scanning coordinate information, to obtain the image data of correction amounts that differ in accordance with coordinates. The correction amounts are in correspondence with different amounts of driving current in a main-scanning direction. Therefore, laser light emission, which provides a light quantity in accordance with the image data, is controlled.

10 Claims, 13 Drawing Sheets

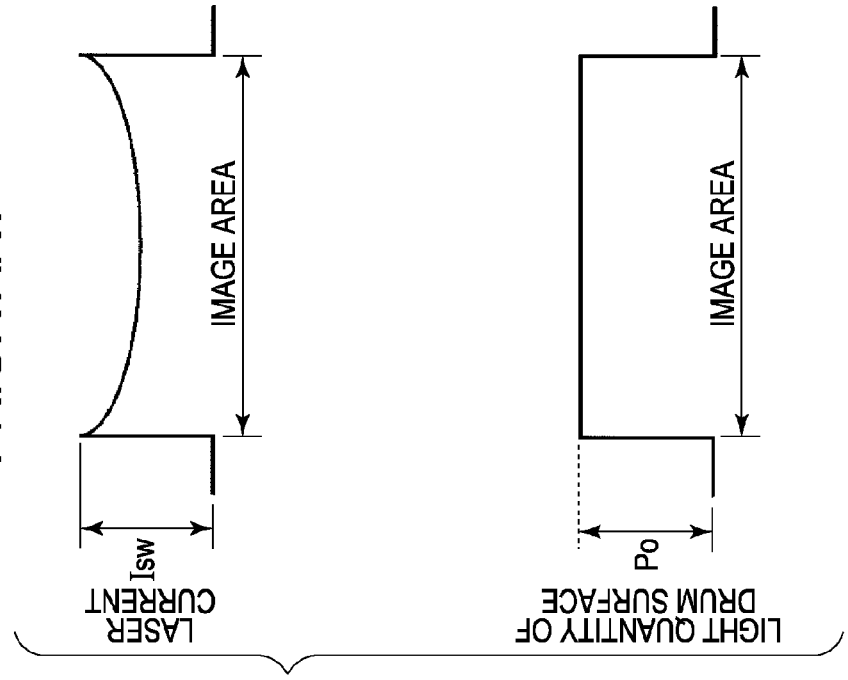
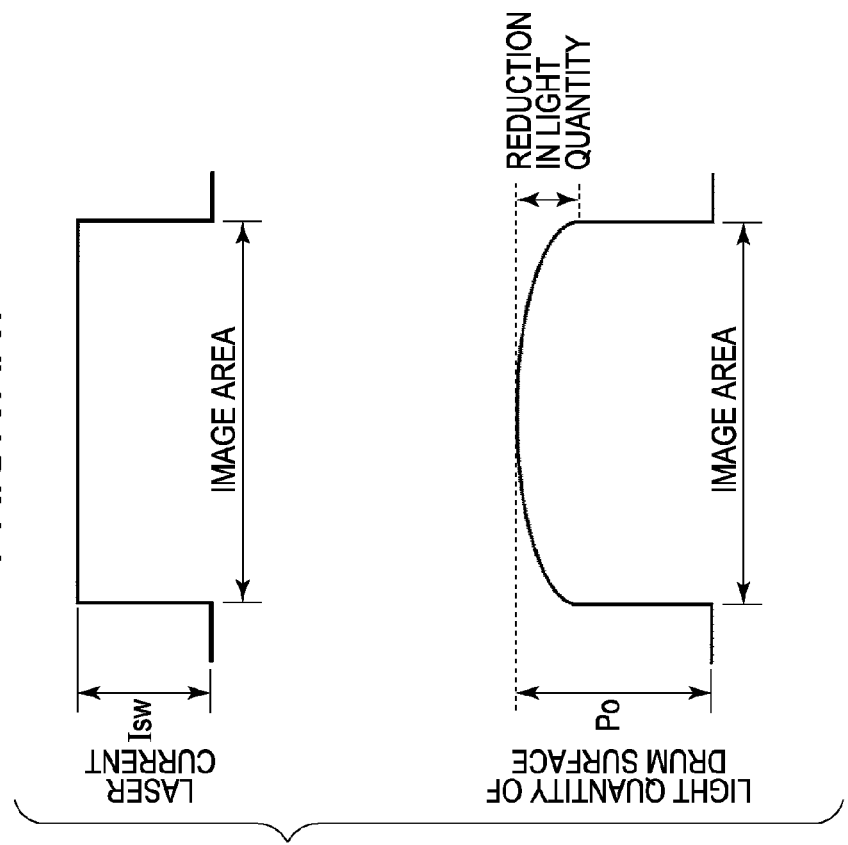

FIG. 16

INPUT DATA SHIFT AMOUNT [dec]

| INPUT DATA [dec] | DRIVING CURRENT CORRECTION VALUE [%] | | | | | |
|---|---|---|---|---|---|---|
| | 0 | -5 | -10 | -15 | -20 | -25 |
| 0 | 0 | 0 | 0 | 0 | 0 | 0 |
| 1 | 0 | 0 | 0 | 0 | 0 | 0 |
| 2 | 0 | 0 | 0 | 0 | 0 | 0 |
| 3 | 0 | 0 | 0 | 0 | 0 | 1 |
| 4 | 0 | 0 | 0 | 0 | 0 | 1 |
| 5 | 0 | 0 | 0 | 0 | 0 | 2 |
| 6 | 0 | 0 | 0 | 0 | 0 | 2 |
| 7 | 0 | 0 | 0 | 0 | 1 | 3 |
| 8 | 0 | 0 | 0 | 0 | 1 | 3 |
| 9 | 0 | 0 | 0 | 1 | 2 | 4 |
| 10 | 0 | 1 | 1 | 1 | 2 | 4 |
| 11 | 0 | 1 | 1 | 1 | 3 | 5 |
| 12 | 0 | 1 | 1 | 2 | 3 | 5 |
| 13 | 0 | 1 | 2 | 2 | 4 | 6 |
| 14 | 0 | 1 | 2 | 2 | 4 | 6 |
| 15 | 0 | 1 | 2 | 3 | 5 | 7 |
| 16 | 0 | 1 | 3 | 3 | 5 | 7 |
| 17 | 0 | 1 | 3 | 4 | 6 | 8 |
| 18 | 0 | 2 | 4 | 4 | 6 | 8 |
| 19 | 0 | 2 | 4 | 5 | 7 | 9 |
| 20 | 0 | 2 | 4 | 5 | 7 | 9 |
| 21 | 0 | 2 | 4 | 6 | 8 | 10 |
| 31 | 0 | 2 | 4 | 6 | 8 | 10 |
| 41 | 0 | 2 | 4 | 6 | 8 | 10 |
| 51 | 0 | 2 | 4 | 6 | 8 | 10 |
| 61 | 0 | 2 | 4 | 6 | 8 | 10 |
| 71 | 0 | 2 | 4 | 6 | 8 | 10 |
| 81 | 0 | 2 | 4 | 6 | 8 | 10 |
| 91 | 0 | 2 | 4 | 6 | 8 | 10 |
| 101 | 0 | 2 | 4 | 6 | 8 | 10 |
| 111 | 0 | 2 | 4 | 6 | 8 | 10 |
| 121 | 0 | 2 | 4 | 6 | 8 | 10 |
| 131 | 0 | 2 | 4 | 6 | 8 | 10 |
| 141 | 0 | 2 | 4 | 6 | 8 | 10 |
| 151 | 0 | 2 | 4 | 6 | 8 | 10 |
| 161 | 0 | 2 | 4 | 6 | 8 | 10 |
| 171 | 0 | 2 | 4 | 6 | 8 | 10 |
| 181 | 0 | 2 | 4 | 6 | 8 | 10 |
| 191 | 0 | 2 | 4 | 6 | 8 | 10 |
| 201 | 0 | 2 | 4 | 6 | 8 | 10 |
| 211 | 0 | 2 | 4 | 6 | 8 | 10 |
| 221 | 0 | 2 | 4 | 6 | 8 | 10 |
| 231 | 0 | 2 | 4 | 6 | 8 | 10 |
| 241 | 0 | 2 | 4 | 6 | 8 | 10 |
| 251 | 0 | 2 | 4 | 6 | 8 | 10 |

RIGHT END
LEFT END ← MAIN SCANNING DIRECTION POSITION → CENTRAL PORTION

IMAGE FORMING APPARATUS AND METHOD OF CONTROLLING THE SAME

BACKGROUND OF THE INVENTION

1. Field of the Invention

The present invention relates to an image forming apparatus, used in, for example, a laser printer or a digital copying machine, that forms an image as a result of performing charging, exposure, and development on a photosensitive member.

2. Description of the Related Art

An image forming apparatus includes a charging device which uniformly charges a photosensitive surface of a photosensitive drum, a latent image forming device which forms an electrostatic latent image, which is in accordance with recording information, on the charged photosensitive surface, a developing device which develops the electrostatic latent image, and a transfer device which transfers developing agent on the photosensitive surface onto a recording sheet. Further, the image forming apparatus generally includes a fixing device that fixes the developing agent on the recording sheet to the recording sheet.

In the image forming apparatus, an electrostatic latent image is sequentially formed while moving the photosensitive surface, the developing device selectively develops the electrostatic latent image with the developing agent, and the transfer device transfers the developing agent onto the recording sheet. The recording sheet having the developing agent transferred thereon is heated while being pressed by the fixing device, so that the developing agent is melted and fixed to the recording sheet.

When an electrophotography image forming apparatus is used for forming an electrostatic latent image, which is in accordance with the recording information, onto the charged photosensitive surface, a method of irradiation using laser light is generally used. The photosensitive surface includes a photosensitive drum and a photosensitive belt. When forming a latent image while moving the photosensitive surface, what is called a raster scanning method is generally used. This is a method in which laser is formed into a beam to scan and expose the photosensitive surface by an optical system.

Hitherto, the optical system of a scanning exposure system has generally used an Under Field Scanner (UFS) method (refer to FIG. 2) as a method of scanning the drum surface (image bearing member) with laser. However, to meet the demand of further increasing speed, an optical system using an Over Field Scanner (OPS) method (refer to FIG. 3) as a method of scanning the drum surface at a higher speed than in the UFS method is beginning to be used. These two methods differ as follows. The UFS method is a method in which a light beam that is smaller than a reflecting surface of a polygonal mirror 6A is used for irradiation, whereas the OFS method is a method in which a light beam that is larger than a reflecting surface of a polygonal mirror 6B is used for irradiation. The OFS method was born as a result of considering the following methods of increasing the scanning speed:

(1) increasing the number of scanning lines provided in one rotation as a result of increasing the number of surfaces of the polygonal mirror, and (2) increasing the number of rotations of the polygonal mirror (that is, reducing the size of the polygonal mirror).

Due to such a structure, the OFS method is advantageous compared to the UFS method from the viewpoints of noise, number of rotations, heat generation, and startup speed. However, it has a problem in that light quantity distribution in a main scanning direction is not uniform.

The ununiformity of the light quantity distribution in the main scanning direction is caused by a change in the quantity of reflection light resulting from a change in the angle of the reflecting surface of the polygonal mirror as shown in FIG. 4.

Laser light emitted from a laser diode has a light intensity distribution characteristic that is not uniform, that is, what is called a Far Field Pattern (FFP) characteristic. When a light beam that is wider than the width of the reflecting surface of the polygonal mirror is incident upon the polygonal mirror, areas of the light beam having different light quantity distributions are reflected due to angles of the reflecting surface of the polygonal mirror as shown in FIG. 4. Therefore, the reflection light quantity in one-scanning period in a main scanning operation varies due to a distribution ununiformity caused by the FFP characteristic.

Due to the change in the reflection light quantity, the light quantity near a main-scanning direction end portion, where the angle of the reflecting surface is large, is less than that near a main-scanning direction central portion, where the angle of the reflecting surface is small. Therefore, when an image is formed, as shown in FIG. 5, the density at the main-scanning direction end portion is reduced. There is a demand for achieving high image quality in addition to increasing the speed of the image forming apparatus. Therefore, it is necessary to correct the density change to form a uniform image without any density change.

Further, the image forming apparatus is required, not only to achieve higher speed and provide higher image quality, but also to have a long life (that is, to be highly durable). To meet such a requirement, a highly durable amorphous silicon drum is beginning to be used as a photosensitive drum required to form an image. The amorphous silicon drum has high durability due to the number of durable drums being approximately 3 million compared to approximately 80 thousand for related OPC (organic semiconductor) drums. The amorphous silicon drum is already practically used in a black-and-white copying machine.

However, the amorphous silicon drum has manufacturing problems, that is, sensitivity ununiformity due to variations in the thickness of a photosensitive film. The sensitivity ununiformity influences charging and exposure, and occurs as density ununiformity of an image. The demand for higher image quality in recent years has given rise to the problem that the amorphous silicon drum cannot be allowed on the market. Consequently, it is necessary to correct the density ununiformity.

A technology regarding density ununiformity is discussed in Japanese Patent Laid-Open No. 2005-70069. Here, a reduction in laser light quantity at the end portion in the main scanning direction in the aforementioned OFS optical system is corrected. In addition, in particular, correction values related to a density change occurring when the resolution is changed are stored in a storing unit, and image data and various correction values corresponding to image coordinates are integrated to control emission intensity of laser light as correction data. By this, the image density is made uniform. To correct printing density in accordance with a density setting to further optimize the density, an image forming apparatus that corrects the density as a result of changing a γ curve is proposed (refer to Japanese Patent Laid-Open No. 2002-172817).

Regarding density ununiformity, a reduction in laser light quantity at the end portion in the main scanning direction in the aforementioned OFS optical system is corrected as a result of changing the laser light quantity in the main scanning direction. Two main methods are available as methods of changing the laser light quantity. In the first main method, the light quantity at a photosensitive drum surface is made uniform using optical components, such as a lens, a reflecting mirror, and an aperture. In the second main method, the light quantity at a photosensitive drum surface is made uniform as a result of electrically changing laser light emission current. Since, in the first main method, it is difficult to individually adjust correction values, the first main method is disadvantageous from the viewpoint of variations in characteristics of laser chips having different individual characteristics. The second main method is an example in which laser light emission is electrically controlled.

In the method of electrically controlling laser light emission, driving current is changed in one main-scanning period. Here, the emission light control is performed so that a central portion of an image has a small amount of driving current, and an image end portion where the light quantity is reduced has a large amount of driving current. Ordinarily, as shown in FIG. 6B, in the emission light control, correction is made using a constant driving current change curve in one main-scanning period. FIG. 6A shows a case in which the laser light driving current is constant.

It is known that the responsiveness of a laser diode differs due to a difference in the laser light driving current. More specifically, when the laser driving current is small due to, for example, a change in the responsiveness of a current control feedback system and in a differential efficiency, influenced by the driving current, the response speed of a laser chip is reduced. In addition, when an input pulse duty is the same, driving with a small driving current causes a laser light emission pulse to be thin, and/or causes the light emission pulse to be formed as if it is driven by a smaller driving current. Therefore, lighting times when the laser diode is turned on and off become different due to a difference in the driving current. Consequently, when the above-described controlling operation in which the driving current is changed in the main scanning period is carried out, the difference in the lighting times, caused by a difference in the driving current, becomes a change in the laser light quantity. Therefore, at the end portion and the central portion of the image in the main scanning direction, a difference between image densities occurs. Further, since the influence of this phenomenon is large when the laser lighting time is short, this phenomenon becomes a problem in, for example, a color printer or a copying machine, where a pulse width modulation is performed.

This problem will be described with reference to FIG. 9. To correct a reduced light quantity at an end portion in the OFS optical system, a correction control operation is carried out to increase and decrease the driving current in the one main scanning period as shown in FIG. 9. In this example, the correction control operation is carried out so that, in the main scanning direction, a central portion has 80% electric current, and the end portion has 100% electric current.

FIG. 10 shown next shows an emission light quantity linearity characteristic with respect to an input pulse duty in this case. This linearity characteristic is obtained by measuring a continuous output light quantity as a result of applying an input pulse corresponding to a pixel. The vertical axis represents a percentage of laser light quantity that is output with respect to a maximum laser light quantity for each electric current (corresponding to 80% and 100% in FIG. 10), in each input pulse duty, when driving is performed at each electric current. The horizontal axis represents a ratio between ON and OFF of an input pulse. The ratio between ON and OFF indicates what percentage of gradation with respect to a maximum gradation the input pulse corresponds to. For example, at a gradation of 100 in an 8-bit 256 gradation, the value at the horizontal axis is equal to 100/256*100(%). The values along the horizontal axis substantially correspond to the gradation of an input image. Therefore, the input pulse duty can be understood as indicating the gradation of image data.

From this graph, it can be understood that, when driving is performed at various driving currents and at the same input pulse duty, the ratios between an actually output laser light quantity and a laser light quantity to be normally output differ from each other. That is, for an input pulse duty providing an intermediate density (used, for example, when halftone printing is performed), the following is true. That is, even if an attempt is made to emit light at the same input pulse duty so as to print an image having uniform density, the ratio between the actually output laser light quantity and the laser light quantity to be normally output at the end portion, where the driving is performed at 100% electric current, differs from the ratio between the actually output laser light quantity and the laser light quantity to be normally output at the central portion, where driving is performed at 80% electric current. For example, when the input pulse duty for the driving at 100% electric current is 50, the laser light quantity that is 50% of the maximum laser light quantity for the driving at 100% electric current should be output. In addition, when the input pulse duty for the driving at 80% electric current is 50, the laser light quantity that is 50% of the maximum laser light quantity for the driving at 80% electric current should be output. However, according to the graph of FIG. 10, when the driving current is 80% driving current, and the input pulse duty is 50, the laser light quantity that is output is only approximately 40% of the maximum laser light quantity for the driving at 80% electric current.

In contrast, according to the characteristic graph, when the duty is 100%, the lighting is continuous. Therefore, the respective light quantities (that are not related to the responsiveness) differ by substantially an electric current ratio, but an ideal light quantity output (%) is achieved independently of the input pulse duty. Therefore, for example, the driving current corrections shown in FIG. 6 are properly reflected.

That is, the present invention can overcome the problem that, when the input pulse duty corresponds to an intermediate density (such as an input pulse duty of 50%), the light quantity can be ideally corrected by driving current at the end portion (100% electric current), but the light quantity is less ideally corrected at the central portion (such as 80% electric current) than at the end portion.

SUMMARY OF THE INVENTION

The present invention provides an image forming apparatus that can correct variations in image density occurring due to variations in light quantity when there is a difference in laser driving current along a scanning direction.

Embodiments of the present invention are provided to overcome the above-described drawbacks of the related technology.

According to an aspect of the present invention, there is provided an image forming apparatus including a laser light emitting unit, a laser driving current controlling unit, and a laser driving signal adjusting unit. The laser light emitting unit is configured to emit laser light on the basis of a laser driving signal that is in accordance with image data and laser driving current. The laser driving current controlling unit is configured to correct the laser light emission as a result of, to restrict light quantity ununiformity at an image bearing member, continuously changing the laser driving current along a main scanning direction. The light quantity ununiformity occurs when the laser driving current causes the light emission at a constant intensity along the main scanning direction. The laser driving signal adjusting unit is configured to further correct the laser light emission as a result of, to restrict the light quantity ununiformity at the image bearing member, adjusting the laser driving signal, in addition to adjusting the continuously changed laser driving current. This makes it possible to provide an image forming apparatus that can correct variations in image density occurring due to variations in light quantity when there is a difference in laser driving current along a scanning direction.

Other features and advantages of the present invention will be apparent from the following description taken in conjunction with the accompanying drawings, in which like reference characters designate the same or similar parts throughout the figures therein.

BRIEF DESCRIPTION OF THE DRAWINGS

FIGS. 6A and 6B illustrate a method of correcting variations in light quantity.

FIG. 16 is a table of calculations of correction amounts according to input data.

DESCRIPTION OF THE EMBODIMENTS

Various embodiments of the present invention will now be described in detail with reference to the drawings. It should be noted that the relative arrangement of the components, the numerical expressions and numerical values set forth in these embodiments are not intended to limit the scope of the present invention unless it is specifically stated otherwise.

First Exemplary Embodiment

A first embodiment of the present invention will now herein be described. The embodiment will be described using a color laser printer (hereunder simply referred to as "printer") serving as a typical example of an image forming apparatus. The color laser printer will similarly be used for the descriptions of each of the other embodiments below. However, the present invention can be similarly applied to, for example, a facsimile or a copying machine, using an electrophotography technology.

Figure 7:
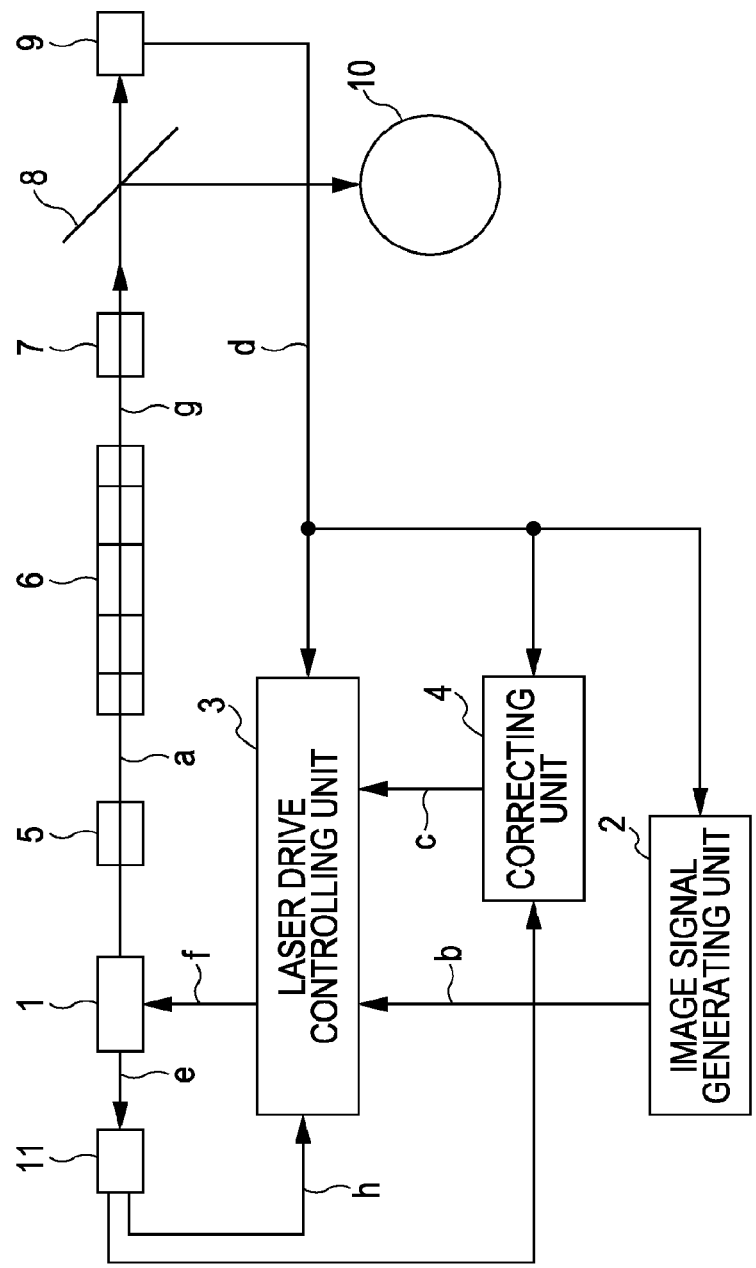
FIG. 7 shows a structure for correcting driving current.

FIG. 7 shows a schematic structure of a scanning optical system of the printer according to the first embodiment (also common to each of the other embodiments below).

In FIG. 7, reference numeral 1 denotes a semiconductor laser (laser light emitting unit), reference numeral 2 denotes an image signal generating unit, reference numeral 3 denotes a laser drive controlling unit, reference numeral 4 denotes a correcting unit, reference numeral 5 denotes a collimator lens, reference numeral 6 denotes a rotatable polygonal mirror, reference numeral 7 denotes an fθ lens, reference numeral 8 denotes a mirror, reference numeral 9 denotes a main scanning synchronizing unit, reference numeral 10 denotes a photosensitive member, and reference numeral 11 denotes a laser-light quantity detecting unit. The semiconductor laser 1 emits laser light based on laser light emission signal (sometimes also called laser driving signal) in accordance with laser driving current (sometimes simply called driving current) and image data. The image signal generating unit 2 is also called a laser driving signal adjusting unit in terms of the image signal generating unit 2 having the function of adjusting a pulse duty in the laser driving signal.

The optical system according to the present invention is, for example, the aforementioned OFS optical system, in which, the width of a beam of parallel light a after passage through the collimator lens is greater than the width of one reflecting mirror surface of the rotatable polygonal mirror 6.

When the printer receives a print command (sometimes called print image) including various control data and drawing data from a controller or a host computer, the printer starts forming an image.

The laser drive controlling unit 3 drives the semiconductor laser 1, so that the semiconductor laser 1 emits laser light. The main scanning synchronizing unit 9 generates a main-scanning synchronization signal as a result of receiving the laser light reflected by the rotatable polygonal mirror 6. The main-scanning synchronization signal is called a BD signal d. The laser light quantity detecting unit 11 receives and detects the laser light, emitted from the semiconductor laser 1, as monitor light e. The monitor light e is called a PD signal h. In general, the monitor light e is detected as a rear beam light of the semiconductor laser. However, it may be detected as a result of separating a front beam light by, for example, a splitter or a half mirror. The laser drive controlling unit 3 performs Auto Power Control (hereunder referred to as "APC") using the PD signal h, to control an emitted light quantity of the semiconductor laser 1 to a constant value.

The BD signal d, generated by the main scanning synchronizing unit 9, is output to the laser drive controlling unit 3, the image signal generating unit 2 (laser driving signal adjusting unit), and the correcting unit 4 functioning as a laser driving current controlling unit that changes laser driving current.

The image signal generating unit 2 generates laser light emission signal related to the image data (image gradation). The laser light emission signal is called an image signal b. The image signal generating unit 2 synchronizes with the BD signal d to output the image signal b to the laser drive controlling unit 3.

The correcting unit 4 generates correction data c used for performing correction control on the driving current of the semiconductor laser 1 at the laser drive controlling unit 3. To restrict light quantity ununiformity at an image bearing member, occurring when the laser driving current causes light emission at a constant intensity along a main scanning direction of a drum surface, in the main scanning direction using the correction data c, the laser driving current can be continuously changed along the main scanning direction for properly correcting the laser light emission. In the present invention, in addition to adjusting the laser driving current, the image signal b may be used to adjust the laser driving signal. Further, although the correction data c is data related to driving current value at each coordinate position and to data regarding coordinate positions in the main scanning direction, the correction data c may be correction current itself. The correcting unit 4 synchronizes with the BD signal d to output the correction data c to the laser drive controlling unit 3, thereby adjusting the image data b and the laser driving signal.

The laser drive controlling unit 3 performs light-emission control on the semiconductor laser 1 at the laser driving current ("f" in FIG. 7) based on the correction data c and at the pulse duty (light-emission time) based on the image signal b.

The laser light from the semiconductor laser 1 is converted into the parallel light a by the collimator lens 5. The parallel light a is converted into scanning light g, which scans in the main scanning direction by means of the rotatable polygonal mirror 6, so that the fθ lens 7 corrects the scanning speed and an optical distortion, such as surface tilting. The scanning light g, which is optically corrected by the fθ lens 7, is reflected by the mirror 8, so that the surface of the photosensitive member 10 is irradiated with the scanning light g, thereby forming an electrostatic latent image on the surface of the photosensitive member 10.

The electrophotography printer in the embodiment selectively adheres developing agent onto the electrostatic latent image that is formed on the photosensitive member in this way. Then, after transferring the developing agent onto a recording sheet, the electrophotography printer heats the recording sheet and the developing agent to fix the developing agent to the recording sheet, so that printing is performed.

Next, a correction method performed in the image signal generating unit, which is a feature of the present invention, will be described.

Figure 10:
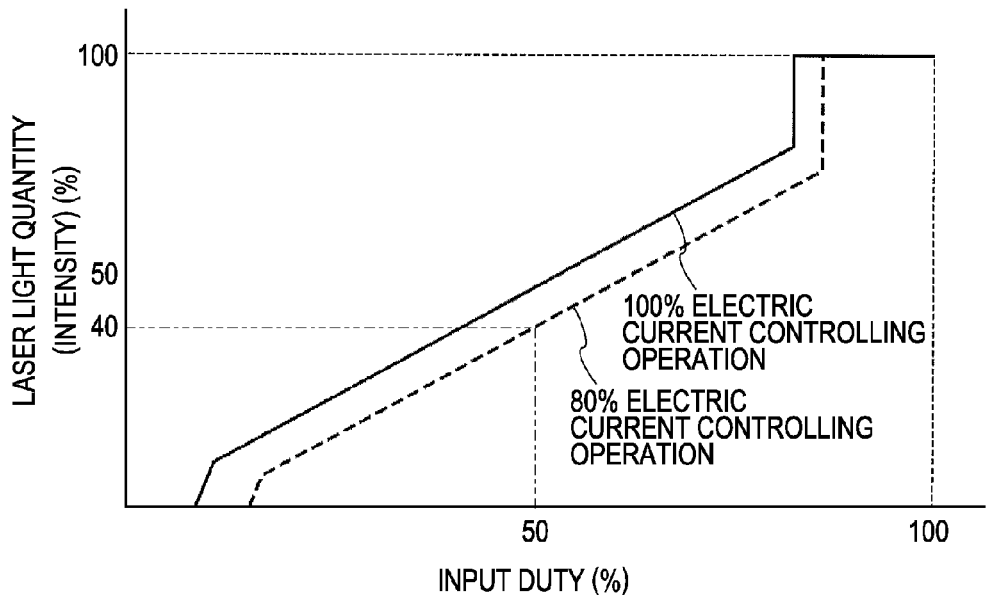
FIG. 10 illustrates an exemplary light quantity linearity in the correction of the driving current.

As described in the related example, as shown in FIG. 10, the present invention can overcome the problem that the light quantity ratios of the end portion and those of the central portion change due to a difference in the input pulse duty. That is, the present invention can overcome the problem that, when the input pulse duty corresponds to an intermediate density (such as an input pulse duty of 50%), the light quantity can be ideally corrected by driving current at the end portion (100% electric current), but the light quantity is less ideally corrected at the central portion (such as 80% electric current) than at the end portion.

Figure 11:
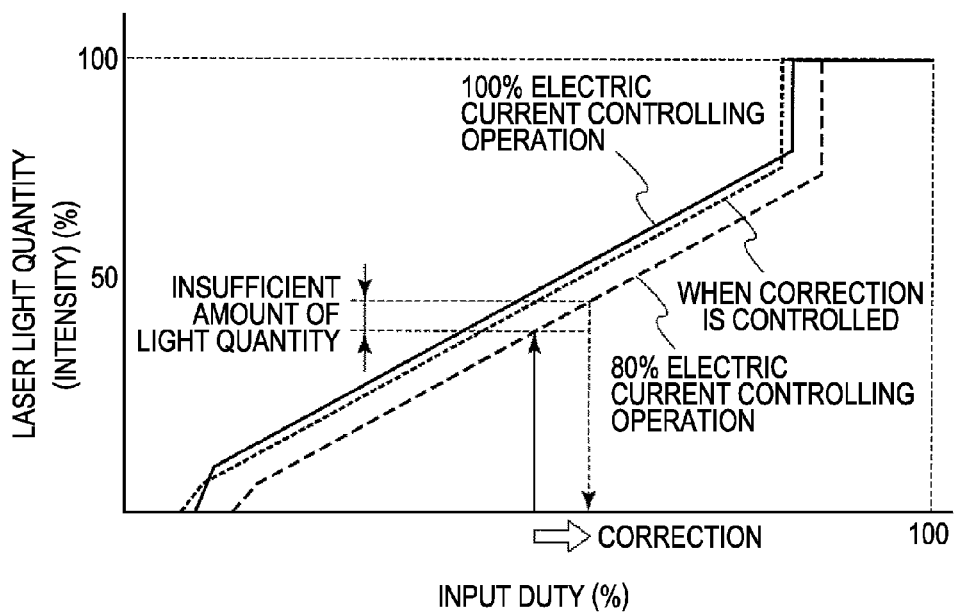
FIG. 11 illustrates an exemplary method of correcting light quantity linearity.

As illustrated in FIG. 10, since this problem occurs due to a difference in the input pulse duty, correction of the light quantity is conducted at an upstream portion of the image signal b (laser driving signal) corresponding to the input pulse duty. A conceptual diagram of the present invention is shown in FIG. 11.

The horizontal axis of the graph represents the input pulse duty. An example in which the input pulse duty is substantially 50% will be given. When laser light is emitted at a fixed input pulse duty of 50%, a laser emission quantity indicated by a solid line is obtained when the electric current is 100%. However, for an 80% electric current, the laser light quantity becomes a quantity indicated by a roughly dotted line in the graph. Therefore, the light quantity differs when a light quantity of 50% is to be obtained. Therefore, for the 80% electric current, the input pulse duty is corrected to a larger value as indicated by the arrow. When the laser light is emitted at the corrected input pulse duty from the graph, even on the graph for the 80% driving current, a light quantity ratio (%) that is substantially equal to an output light quantity ratio for the 100% electric current can be obtained. As a result, with reference to the input pulse duty, as in the graph drawn by a fine dotted line, the light quantity is corrected so that the 80% electric current driving graph is shifted towards the left.

Figure 8:
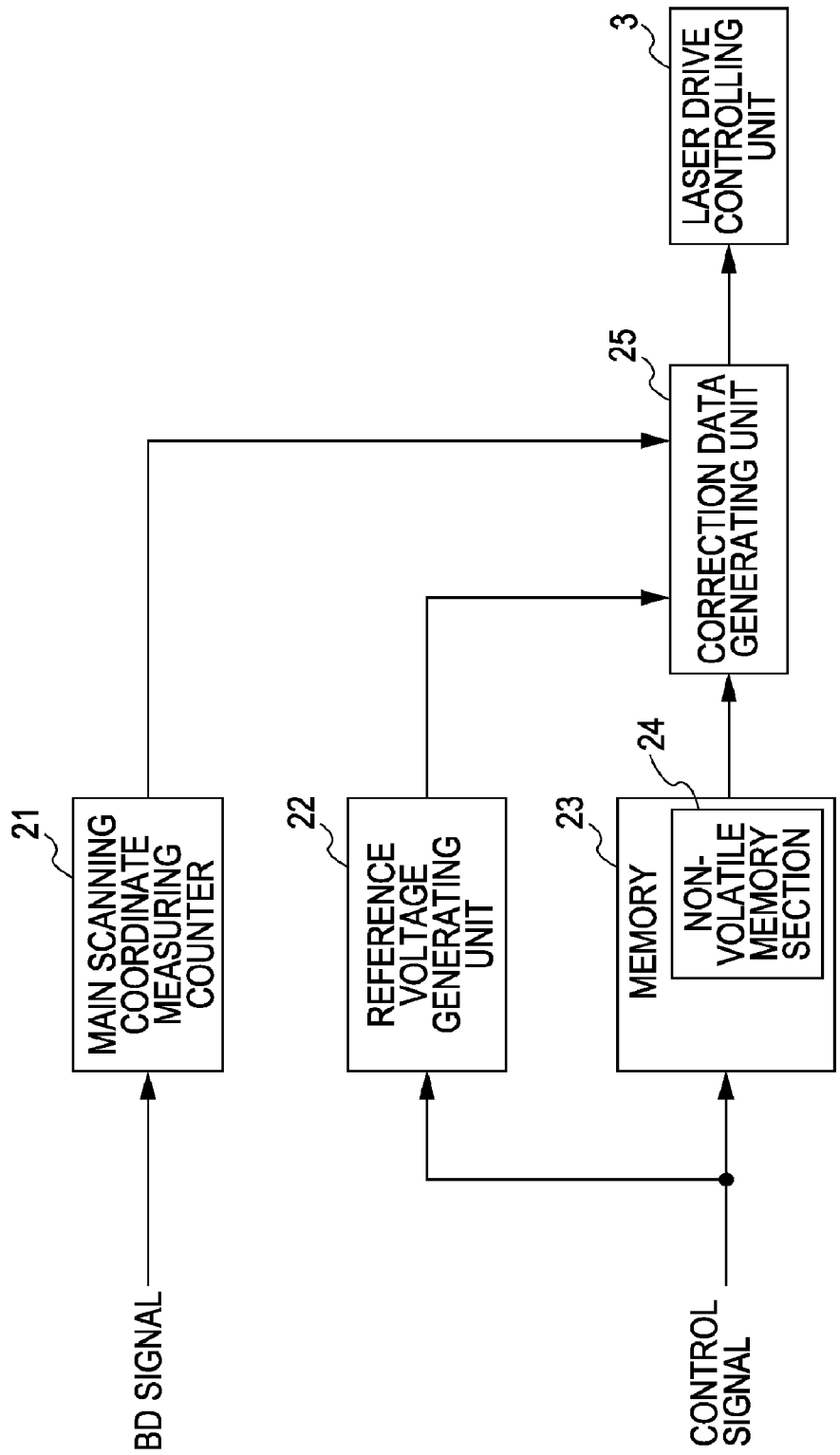
FIG. 8 is a block diagram illustrating the correction of the driving current.
Figure 15:
FIG. 15 is a table of calculations of correction amounts.

FIG. 15 shows an exemplary table of correction values for making corrections in accordance with differences in laser emission characteristics that are in accordance with laser driving current. The driving current correction amounts in FIG. 15 are, as illustrated in FIG. 8, correction electric currents that change successively in response to the movement of the position of the drum surface (image bearing member surface) in the main scanning direction from the right end to the central portion, and from the central portion to the left end. Data correction amounts are in correspondence with the respective driving current correction values, and are values that indicate how much input image data is to be adjusted (increased). The relationship between the driving current correction values and the Data correction amounts in FIG. 15 indicate the relationship between the main-scanning direction positions in exposure scanning and the Data correction amounts. The main-scanning direction positions are indicated on the left in FIG. 15. The relationship between the driving current correction values and the Data correction amounts in FIG. 15 can also be understood as indicating the relationship between timings (with reference to detection of the BD signal d) and the Data correction amounts.

The driving current correction values can be changed as a result of providing correction values in steps that are larger in number than six steps shown in FIG. 15. The method of changing the driving current will be described using the term "continuously." However, for digital processing, the term "in steps" is actually the more precise term. However, the fact that the term "continuously" in digital processing corresponds to "in steps" can be easily understood by those skilled in the art. In the following description, to correct input pulse duty in accordance with the driving current correction amount in the embodiment, a method of changing and correcting a pulse width as a result of adding only a predetermined value to the input image data will be used.

As a result of verification, when the duty is simply shifted towards the left with the correction amount being fixed, for example, at an area where the input pulse duty is large, a position where continuous lighting is 100% light emission is also shifted towards the left. Therefore, it is known that there is an input pulse duty condition that does not completely match an input pulse duty condition when driving at 100% electric current. That is, an optimum correction amount value varies in accordance with input pulse duty. Consequently, to maximize performance, it is desirable to make corrections as a result of determining correction amounts in accordance with the respective input pulse duties.

According to the embodiment, FIG. 16 illustrates a table in which correction values are determined from input image data (input pulse duty). FIG. 16 also illustrates a method of adjusting a laser driving signal using a table for adjusting the laser driving signal in accordance with the laser driving current amount and pulse duty in the image data that is input. As in FIG. 15, in FIG. 16, the relationship between driving current correction values and Data correction amounts indicates the relationship between main-scanning direction positions in exposure scanning and the Data correction amounts. The main-scanning direction positions are indicated at the lower side in FIG. 16. The relationship between the driving current correction values and the Data correction amounts can also be understood as indicating the relationship between timings (with reference to detection of the BD signal d) and the Data correction amounts.

However, since a controlling circuit in which the correction amounts are made variable in accordance with the input pulse duty requires a complicated computation, costs are considerably increased. Therefore, the correction values may be fixed as shown in FIG. 15.

Accordingly, the image signal generating unit functions as a laser-light emission time correcting unit that corrects laser-light emission time using the correction amounts based on information related to exposure scanning. Here, the information related to exposure scanning corresponds to, for example, information regarding scanning positions in one scanning period when a light-emitting unit is driven under different driving currents in an exposure scanning direction (main scanning direction). In addition, the information related to exposure scanning corresponds to, for example, information regarding driving current amount when the light-emitting unit is driven in different exposure scanning directions (main scanning directions). Further, the information related to exposure scanning corresponds to, for example, information regarding timings provided with reference to detections of the BD signal d. Since the scanning position information within one operation interval and the timings, provided with reference to the detections of the BD signal d, are in synchronism, the timing information can be used. When various types of information regarding exposure scanning are used, the laser driving signal is adjusted in addition to the continuously changed laser driving current, so that, to restrict light quantity ununiformity at the drum surface, a laser-light emitting unit can be corrected using the correction amounts in accordance with the main-scanning direction positions in the exposure scanning. To restrict the light quantity ununiformity at the drum surface, it is necessary to control various factors causing the light quantity ununiformity. Therefore, here, restricting the light quantity ununiformity at the drum surface at least indicates consequentially restricting the light quantity ununiformity appearing at the drum surface as a result of not adjusting the laser driving signal.

The first embodiment can mitigate the above-described problem using the above-described correction method which can maximally optimize the correction amounts.

The structure of the correcting unit 4, which is a feature of the embodiment, will be described in more detail with reference to FIG. 8.

In the correcting unit 4, reference numeral 21 denotes a main scanning coordinate measuring counter that, on the basis of the BD signal d, counts coordinate positions in the scanning direction and outputs coordinate information. By inputting a count signal of the main scanning coordinate measuring counter 21 to each functional block (such as a correction data generating unit 25), each functional block can specify a main-scanning direction coordinate at which laser-light emission is being performed. In addition, by detecting a timer value from a timing of detection of the BD signal d and the correction data c, it is possible to indirectly specify a main-scanning direction position, so that laser light emission can be adjusted using a correction amount that is in accordance with the laser driving current that changes continuously in response to the main-scanning direction position. Reference numeral 22 denotes a reference voltage generating unit. Reference numeral 23 denotes a memory including a non-volatile memory section 24. Reference numeral 25 denotes a correction data generating unit.

The correction data generating unit 25 computes the coordinate information of the main scanning coordinate measuring counter 21, control voltage from the reference voltage generating unit 22, and correction information output from the memory 23, to perform laser driving control at the laser drive controlling unit 3. In this case, laser driving current control for the characteristic shown in FIG. 9 is carried out.

Figure 9:
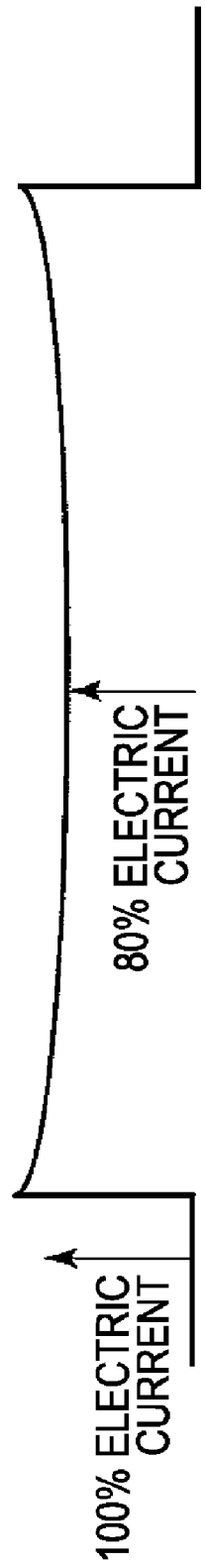
FIG. 9 illustrates the correction of the driving current.

As shown in FIG. 9, to restrict light quantity ununiformity at the image bearing member, occurring when the laser driving current causes light emission at a constant intensity along the main scanning direction, the correction data generating unit 25 continuously changes the laser driving current. This adjusts a laser driving signal to correct the laser-light emission.

The nonvolatile memory section 24 is formed in the memory 23, and can access data through a control signal shown in FIG. 8. In addition, the nonvolatile memory section 24 can either previously store fixed values or individually store the correction data c so that the light quantity with which the photosensitive member 10 is irradiated becomes uniform when, for example, factory shipment is performed. In the embodiment, the phrase "so that the light quantity . . . becomes uniform" assumes that current versus light-output characteristics (laser light emission characteristics) of the laser-light emitting unit is ideal. Actually, further correction of the laser driving signal needs to be carried out when the driving current is reduced.

Figure 1:
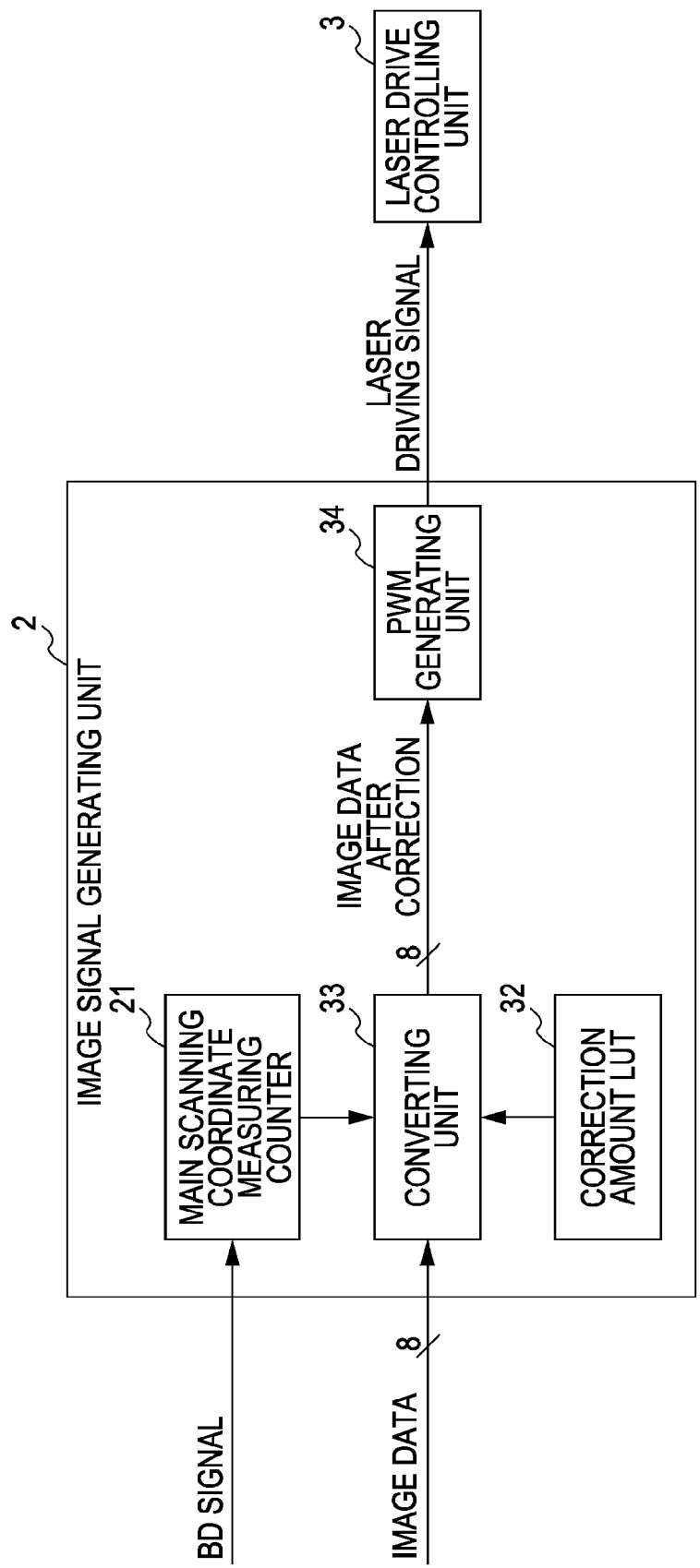
FIG. 1 illustrates a first embodiment according to the present invention.
Figure 2:
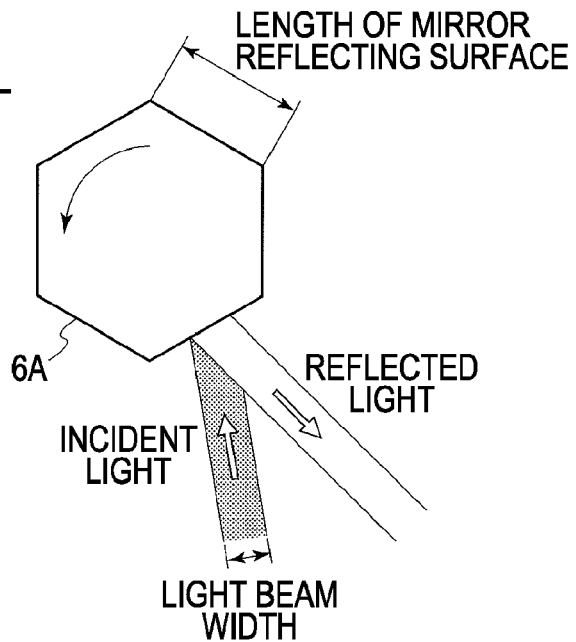
FIG. 2 shows a structure of a UFS optical system.
Figure 3:
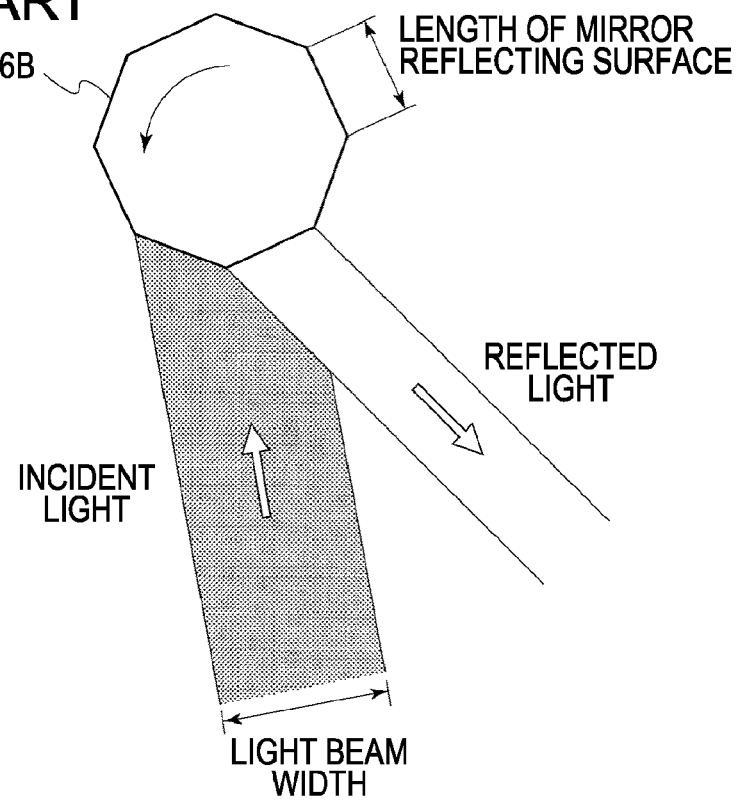
FIG. 3 shows a structure of an OFS optical system.

Referring to FIG. 1, the image signal generating unit 2, serving as a laser driving signal adjusting unit, includes the main scanning coordinate measuring counter 21, a correction-amount lookup table (LUT) 32, a converting unit 33, and a pulse-width modulating (PWM) generating unit 32. In the embodiment, the image signal generating unit performing the correction of the laser driving signal is realized as a result of providing a hardware module in an application specific integrated circuit (ASIC) in the printer.

The correction amount LUT 32 stores correction amounts (for example, see FIGS. 15 and 16), and can correct laser-light emission using the correction amounts that are in accordance with the main-scanning direction positions in the exposure scanning. In the embodiment, the correction amount LUT 32 includes RAM, and the internal correction amounts are changeable. The correction values of RAM can be determined by a previously determined ROM control parameter, or can be provided by loading values of, for example, a nonvolatile memory (not shown).

The BD signal, which is a main-scanning reference signal, and the image data are input to the image generating unit 2. Using the converting unit 33, the main scanning coordinate information (output from the main scanning coordinate measuring counter) and the correction amounts (recorded in the correction-amount LUT 32) are referred to, to convert a proper amount of the image data. Here, the converting unit 33 performs calculations in accordance with the main scanning coordinate information, to obtain image data of correction amounts that differ in accordance with coordinates. The correction amounts are in correspondence with different amounts of driving current in the main-scanning direction. The image signal generating unit 2 includes the PWM generating unit 34 in the interior thereof. The PWM generating unit 34 generates a laser driving signal from the corrected image data. The laser driving signal is sent to the laser drive controlling unit 3 to perform laser light-emission control. That the laser driving signal, output to the laser drive controlling unit 3, is further adjusted using the correction data c is as described above. Accordingly, the adjustment will be not described in detail here.

As described above, variations in the light quantity, caused by a reduction in the laser driving current, can be controlled by the embodiment.

A predetermined electrostatic latent image is formed on the photosensitive member 10 by controlling laser light emission. In the embodiment, the operations of the printer other than the operation of forming an electrostatic latent image are the same as those in the related art, so that they will not be described below.

Figure 12:
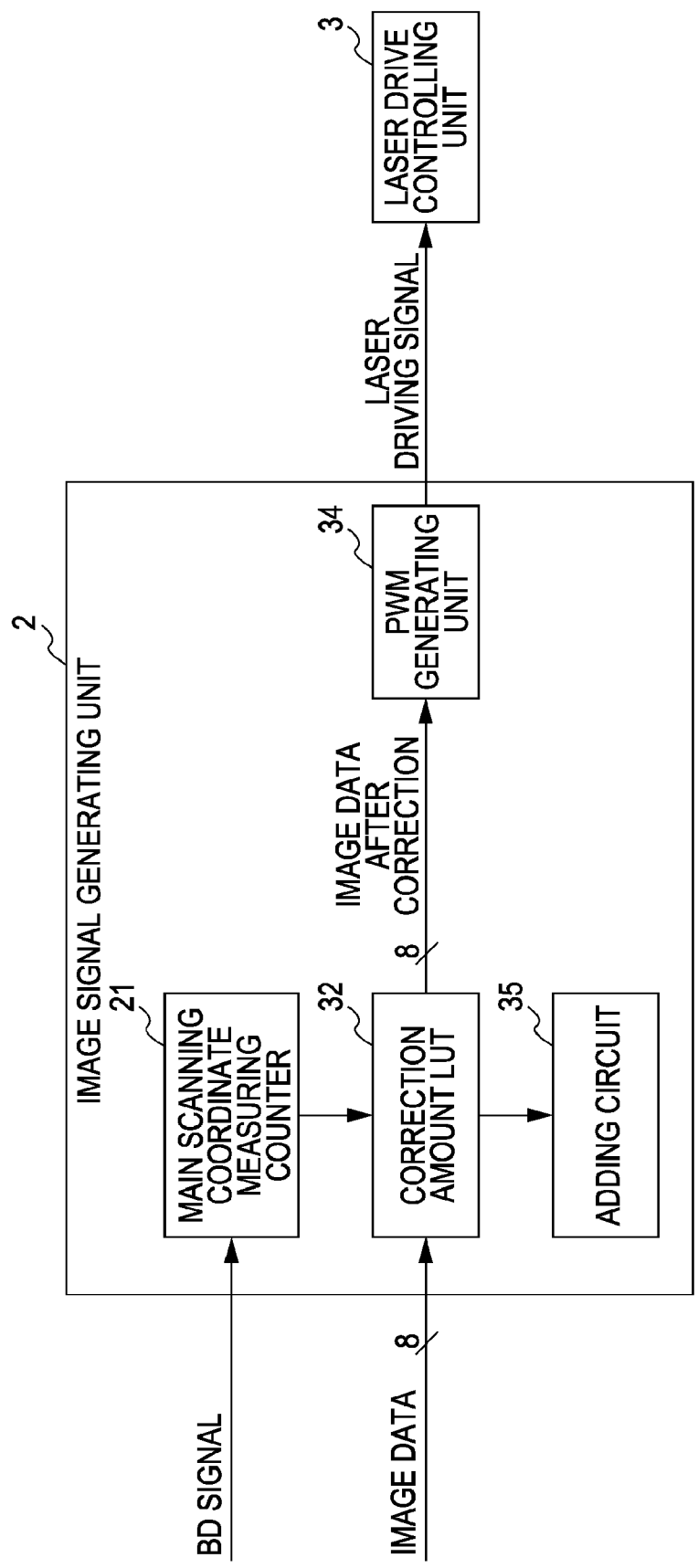
FIG. 12 illustrates an image signal forming unit 2 in the first embodiment.

Next, the structure of the image signal generating unit 2 will be described in more detail. Referring to FIG. 12, in the embodiment, the image signal generating unit, used to perform corrections, is realized by providing a hardware module in an ASIC in the printer. Obviously, the image signal generating unit can be realized as a result of performing programming and executing the program by a central processing unit (CPU).

As shown in FIG. 12, the image signal generating unit 2 includes the main scanning coordinate measuring counter 21, the correction amount lookup table (LUT) 32, an adding circuit 35, and the PWM generating unit 34.

The image signal generating unit 2 is a controlling unit to which the BD signal, which is a main-scanning reference signal, and the image data are input, and which outputs a laser driving signal. The correction amount LUT 32 stores correction amounts, and includes, in the embodiment, RAM so that the internal correction amounts can be changed. The correction values of RAM can be determined by a previously determined ROM control parameter, or can be provided by loading values of, for example, a nonvolatile memory (not shown).

The main scanning coordinate measuring counter 21 outputs main scanning coordinate information on the basis of the BD signal. The output data is input to an address section of the following correction amount LUT 32 to select a correction amount in the LUT. The adding circuit 35 adds correction amount information, which is an output of the correction amount LUT 32, and the input image data.

The image signal generating unit 2 includes the PWM generating unit 34 in the interior thereof. The PWM generating unit 34 generates a laser driving signal from the corrected image data. The laser driving signal is sent to the laser drive controlling unit 3 to perform laser light-emission control. That the laser driving signal, output to the laser drive controlling unit 3, is further adjusted using the correction data c is as described above. Accordingly, the adjustment will be not described in detail here.

As described above, the embodiment makes it possible to control laser light emission without light quantity variations in the main scanning direction of the drum surface.

Second Exemplary Embodiment

A second embodiment of the present invention will be described. The second embodiment differs from the first embodiment in the structure of an image signal generating unit 2 (laser driving signal adjusting unit) and a correcting unit 4. The other structural components are similar to those of the image forming apparatus according to the first embodiment, so that they will not be described below.

Figure 13:
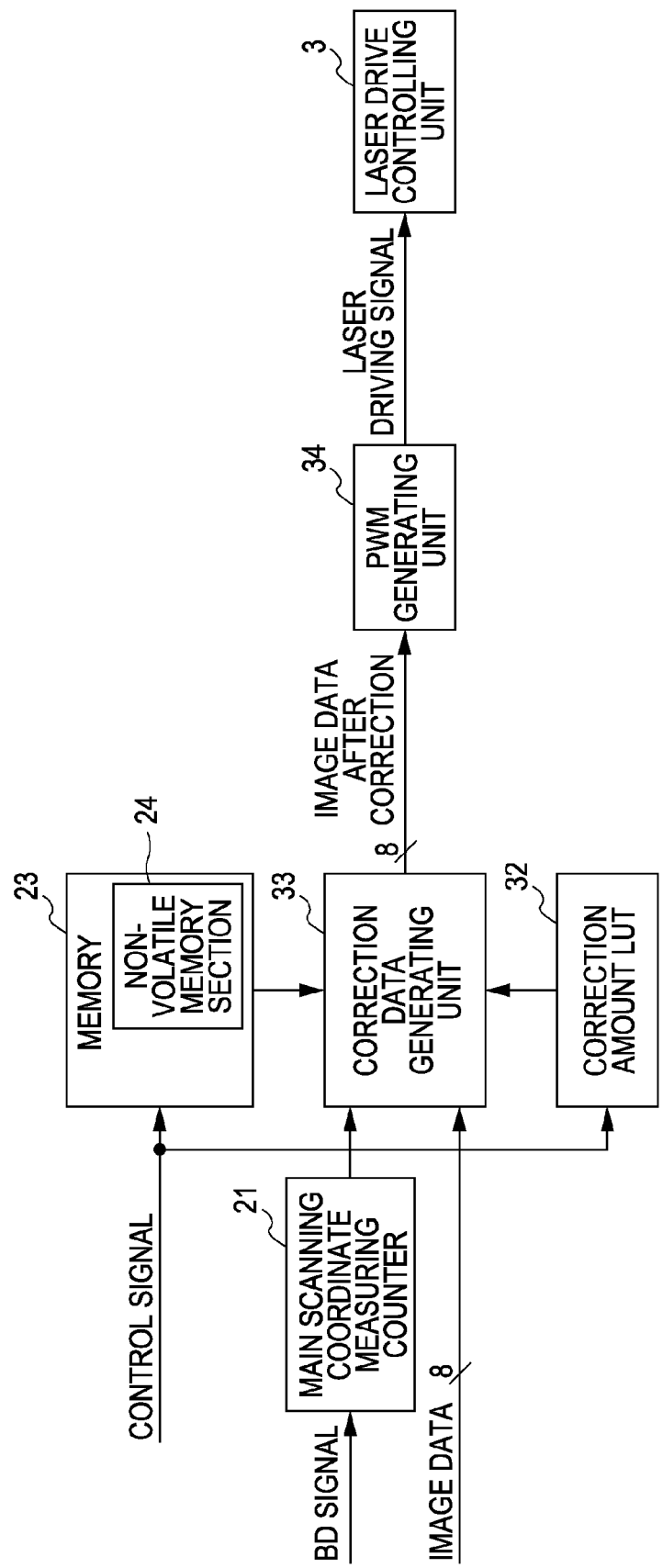
FIG. 13 illustrates an image signal generating unit 2 in a second embodiment of the present invention.

FIG. 13 illustrates a method of correction by the image signal generating unit according to the second embodiment. In the embodiment, the image signal generating unit performing correction of a laser driving signal is realized as a result of providing a hardware module in an application specific integrated circuit (ASIC) in a printer.

The second embodiment can realize, using one structure, correction performed on an image signal b (laser driving signal) at the image signal generating unit 2 and correction of a laser driving current by the correcting unit 4.

A method in which functional modules of the image signal generating unit 2 and the correcting unit 4 are integrated, and correction and conversion are performed at one location at a correction data generating unit 33 will be described.

Correction functions according to the second embodiment are achieved by a main scanning coordinate measuring counter 21, a correction amount lookup table (LUT) 32, a memory 23, incorporating a nonvolatile memory section 24, a pulse-width modulating (PWM) generating unit 34, and the correction data generating unit 33.

The nonvolatile memory section 24 is formed in the memory 23, and can access data through a control signal shown in FIG. 13. In addition, the nonvolatile memory section 24 can either previously store fixed values or individually store correction information so that light quantity with which a photosensitive member 10 is irradiated becomes uniform when, for example, factory shipment is performed. The memory 23 outputs correction amount information to the correction data generating unit 33.

A BD signal, which is a main-scanning reference signal, is input to the main scanning coordinate measuring counter 21, so that main scanning coordinate information is output to the correction data generating unit.

The correction amount LUT 32 stores correction amounts, and includes, in the embodiment, RAM. The internal correction amounts can be changed by a control signal from outside a module. The correction values of RAM can be determined by a previously determined ROM control parameter, or can be provided by loading values of, for example, a nonvolatile memory (not shown).

The main scanning coordinate measuring counter 21 outputs main scanning coordinate information on the basis of the BD signal. The output data is input to the following correction data generating unit 33.

The correction data generating unit 33 refers to the correction amount LUT 32, and provides a different correction amount to the image data in accordance with the main scanning coordinate information. Further, on the basis of the information of the memory 23, the correction data generating unit 33 provides a different correction amount to the image data in accordance with the main-scanning coordinate information. Though described in detail later, here, data conversion correction is performed on the image data, instead of changing the laser driving current as in the first embodiment. That is, the laser driving current is constant in the main scanning direction, and a change characteristic corresponding to the aforementioned laser driving current characteristics in the main scanning direction (refer to, for example, FIG. 9) is provided to a pulse duty of the image data. This makes it possible to obtain characteristics that are equivalent to those shown in, for example, FIG. 9 in terms of laser light emission.

The PWM generating unit 34 generates a laser driving signal from the corrected image data. The generated laser driving signal is transmitted to a laser drive controlling unit 3 to control laser light emission. That the laser driving signal, output to the laser drive controlling unit 3, is further adjusted using correction data c is as described above. Accordingly, the adjustment will be not described in detail here.

According to the second embodiment, correction of a laser driving current is not carried out as a result of performing two types of corrections at the correction data generating unit 33. The results of the two types of corrections reflect results of laser pulse-width modifications.

In the previously described correction of characteristics of the OFS optical system, which is a first correction based on information of the memory 23, the driving current at the central portion of an image is made lower than that at an end portion of the image, thereby reducing and output light quantity. In other words, the image data is corrected so that pulse duty is small (narrow) at the image central portion.

A difference in linearity, resulting from a difference in driving current, does not need to be corrected (that is, a second correction does not need to be performed). This is because, if only the image data is corrected, a difference in linearity, resulting from a difference in driving current, does not occur. Here, the correction amount LUT 32 provides the following correction information. In the case where light-emission signals having 100% duty are generated at a central portion and an end portion of a main-scanning image, when these are continuous pixel data, light emission becomes continuous at both the central portion and the end portion of the main-scanning image. This results in a difference between light quantities, which is a problem in the OFS optical system. Therefore, the correction amount LUT 32 provides a table in which a maximum pulse duty is limited at the central portion of the image.

In general, the correction amount LUT 32 is conveniently used for shifting pulse duty without depending upon differences between lasers. Correction of the memory incorporating the nonvolatile memory section 24 makes it possible to individually write correction values in accordance with the differences between the lasers. Therefore, the correction of the memory is suitable for absorbing variations between the lasers.

As described above, the embodiment makes it possible to control laser light emission without variations in light quantity.

The other controlling operations are similar to those in the first embodiment, so that they will not be described.

Third Exemplary Embodiment

A third embodiment of the present invention will be described. The third embodiment differs in the structure of an image signal generating unit 2. The other structural components are similar to those of the image forming apparatus according to the first embodiment, so that they will not be described below.

Figure 14:
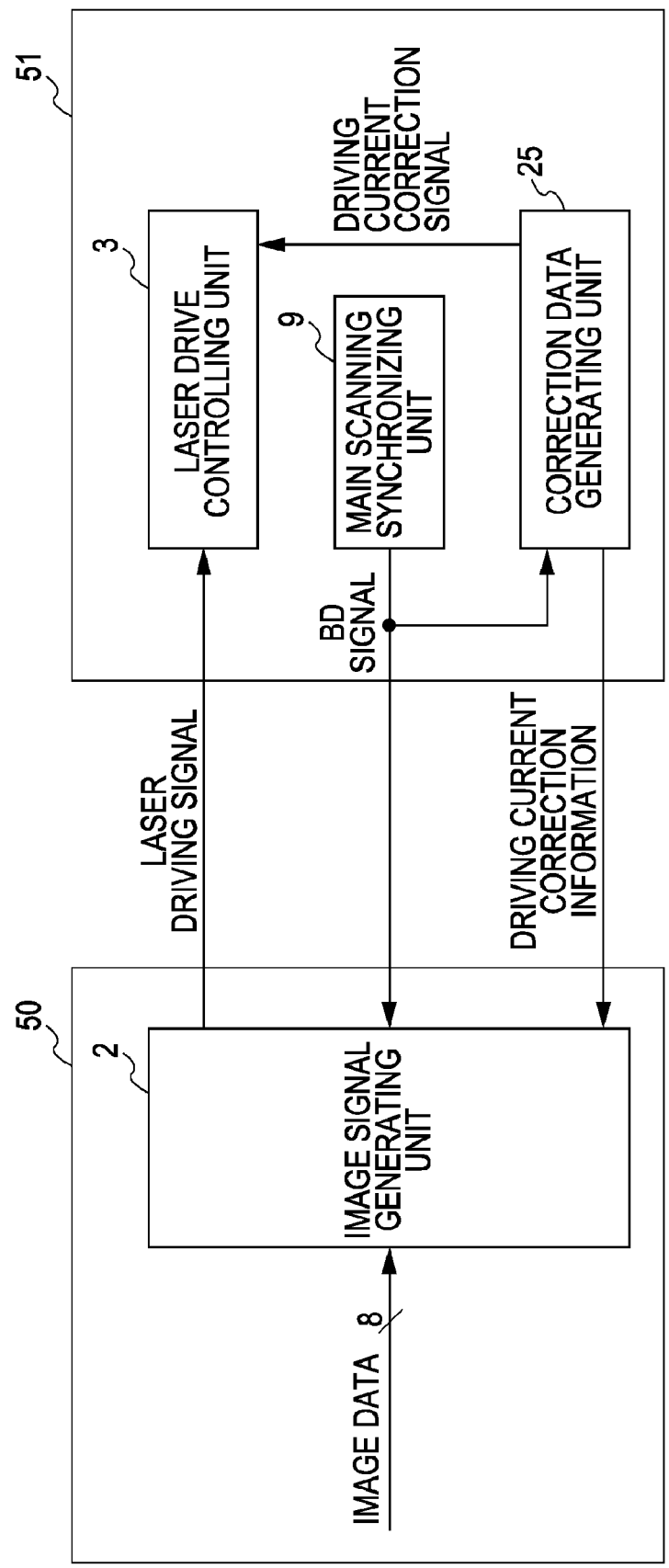
FIG. 14 illustrates an image signal generating unit 2 in a third embodiment of the present invention.

A method of correction by the image signal generating unit according to the third embodiment will be described with reference to FIG. 14.

An image forming apparatus includes two main internal structural portions. They are a controlling device 50 and an image forming device 51. Print image is externally input to the controlling device 50, so that the controlling device 50 outputs image data based on the print image to the image forming device 51. The image data, output from the controlling device 50 on the basis of the print image, is input to the image forming device 51. The controlling device 50 includes a host computer or an interface connected to, for example, a network. In addition, the controlling device 50 receives the print image to generate a laser driving signal from the image data. That is, the controlling device 50 constitutes an image data generating device, and can generate the image data and perform image data conversion including image processing.

The image forming device 51 has an actual printing function, and prints an image on the basis of the laser driving signal transmitted from the controlling device 50. The main functions of the image forming device 51 are, for example, controlling conveyance of a print sheet, an optical system, development using a developing agent, a transfer operation, and a fixing operation.

The conversion of the image data is carried out by the controlling device 50. The image signal generating unit performing correction is realized as a result of providing a hardware module in an application specific integrated circuit (ASIC) in the printer.

The structural features for correction of the image data at the image signal generating unit is similar to that illustrated in FIG. 12 in the first embodiment. The image signal generating unit 2 includes a main scanning coordinate measuring counter 21, a correction amount lookup table (LUT) 32, an adding circuit 35, and a pulse-width modulating (PWM) generating unit 34. Data of the correction amount LUT 32 is generated on the basis of driving current correction information transmitted from the correction data generating unit 25 of the image forming device 51. That is, the data in the table is provided as a result of calculating a suitable value by a central processing unit (CPU, not shown) of the controlling device in accordance with a driving current correction amount. The correction amount is in accordance with a laser driving current that changes continuously in response to a main-scanning direction position. In the embodiment, as illustrated in FIG. 16, a method in which correction amounts of the driving current and image data correction amounts with respect to respective image data are determined, and are stored in the correction amount LUT 32 is used.

Therefore, in the embodiment, driving current correction amounts (driving current correction values) or information indicating them at the image forming device 51 are transmitted (for notification) as information from the correction data generating unit 25 to the controlling device 50. The correction data generating unit 25 includes a section that transmits the correction amount information to the image data generating device. Here, "the correction amount information" refers to the correction laser driving current amounts shown in FIG. 15 or FIG. 16. Various other forms of information can be used as long as the information allows the controlling device 50 to identify the correction laser driving current amount.

The controlling device 50 performs image data correction conversion, such as image processing, color correction, and correction of Υ in accordance with developing agent characteristics. In the embodiment, the image data conversion (image data adjustment), described in the present invention and performed in accordance with the driving current correction amount, is performed on final data obtained after performing these various image data correction conversions. The image data conversions make it possible to correct laser light quantity more precisely. The image data adjustments are as described in the previous embodiments.

The laser driving current is corrected by the image forming device 51. The image forming device 51 includes a main scanning synchronizing unit 9, a laser drive controlling unit 3, and the correction data generating unit 25. A BD signal of the main scanning synchronizing unit 9 is output to the correction data generating unit 25 and to the image signal generating unit 2 in the controlling device 50.

The generation of a driving current correction signal by the correction data generating unit 25 will not be described in detail below because it is equivalent to the generation of a driving current correction signal by the correction data generating unit 25 at the correcting unit 4 in each of the previous embodiments.

The PWM generating unit 34 in the aforementioned image signal generating unit 2 can be formed in the image forming device 51 because the PWM generating unit 34 is not directly related to image data conversion. In this case, the laser driving signal in FIG. 14 corresponds to data before pulse width modulation, so that it can be transmitted through an 8-bit data bus. Even if the PWM generating unit 34 is formed in the image forming device 51, it is possible to apply the technology, described in this embodiment, of converting image data at the controlling device 50.

As described above, in the embodiment, image-data conversion correction is performed by the controlling device 50, which generates a laser driving signal, and a laser driving current is corrected by the image forming device 51, thereby adjusting the laser driving signal.

The embodiment makes it possible to control laser light emission without light quantity variations in the main scanning direction of a drum surface (image bearing member).

The other printer operations are the same as those in the related art and in each of the previous embodiments, so that they will not be described.

Fourth Exemplary Embodiment

The first and third embodiments describe an adjusting method in which a laser driving signal is not corrected when the input pulse duty in FIGS. 10 and 11 corresponds to an intermediate density, that is, when the larger the driving current correction value, the larger the laser driving signal, and the driving current correction value is 0. However, the present invention can be applied to other embodiments, which are described in detail below.

When light quantity ununiformity at the image bearing member, occurring when a laser driving current causes light emission at a constant intensity along the main scanning direction, is to be restricted, a driving current value can be previously increased by an amount including the Data correction in FIG. 15. In this case, however, at the portion in FIG. 10 where the input pulse duty is large, the light quantity is increased more than is necessary. Therefore, at this portion, it is necessary to correct laser light emission as a result of adjusting a laser driving signal by the image signal generating unit 2.

More specifically, when the input pulse duty corresponding to a laser light quantity ratio of 100% is set, a method of adjusting an area gradation density which turns off a pulse by a light-quantity percentage to be reduced can be used. For example, if five pulses are turned off for every 100 pulses, the density can be reduced by approximately 5%. This makes it possible to make simpler a circuit structure related to adjusting a laser driving signal.

Fifth Exemplary Embodiment

The above-described first, third, and fourth embodiments describe a form in which correction in accordance with differences in laser-light emission characteristics, which are in accordance with laser driving current, is carried out as a result of adjusting the duty pulse of a laser driving signal when the driving current correction value is large. However, the present invention is not limited thereto. Instead of, as in the first to third embodiments, adjusting the duty pulse of a laser driving signal at the portion where the driving current correction value is large, a method of adjusting an area gradation density, such as that illustrated in the fourth embodiment, may be used. This makes it possible to make simpler a circuit structure related to adjusting a laser driving signal.

Sixth Exemplary Embodiment

Figure 4:
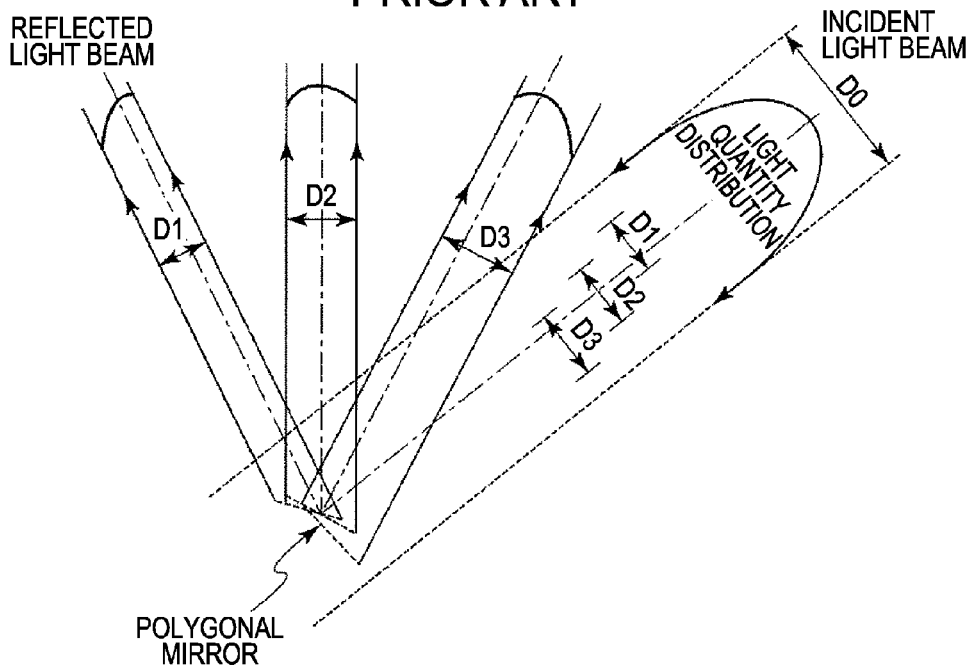
FIG. 4 illustrates variations in light quantity in the OFS optical system.
Figure 5:
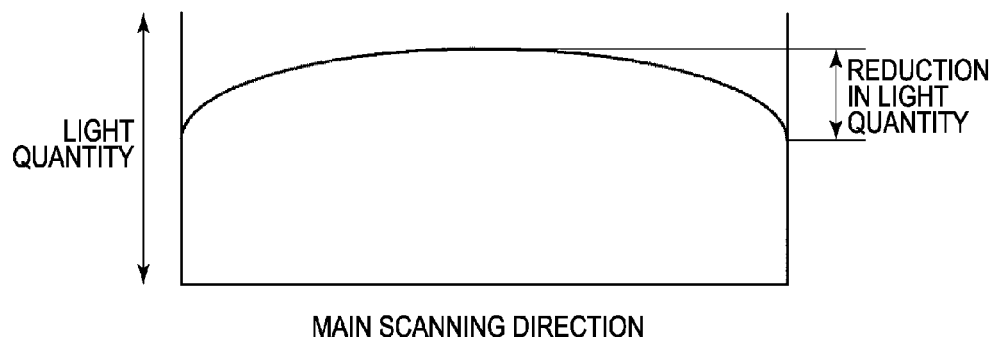
FIG. 5 illustrates the variations in light quantity in the OFS optical system.

The above-described first to fifth embodiments describe a mechanism for, as shown in FIG. 9, overcoming the problem that light quantity distribution in the main scanning direction is not uniform, as a result of extracting a change in reflection light quantity resulting from a change in the angle of the reflecting surface of the polygonal mirror as shown in FIG. 4. However, the present invention can be applied to other forms. For example, when there is a light quantity ununiformity at the drum surface due to the distance between the drum surface and the laser light emitting unit, the emission intensity of the laser light emitting unit may be increased as its distances increases from the drum surface.

Considering the factor regarding the distance between the drum surface and the laser light emitting unit and the factor regarding light quantity ununiformity at the drum surface in the first to fifth embodiments, the laser driving signal adjusting unit according to the invention of the application can be applied even if the laser driving current is continuously changed. In this case, in accordance with the correction amounts of the laser driving current, which consider a plurality of factors regarding the light quantity ununiformity, correction tables similar to those shown in FIGS. 15 and 16 are provided, and the laser driving signal is adjusted. However, the main-scanning position at which the driving current correction value (amount) is largest is not necessarily at a central portion in the main scanning direction. Even in this case, however, a large value of the Data correction amount is used at the portion where the driving current correction value is largest.

Seventh Exemplary Embodiment

Even in controlling laser emission other than by the OFS method, a system that changes a driving current in a laser scanning system can be expected to provide similar advantages. The controlling of laser emission other than by the OFS method is effective, for example, when light quantity ununiformity in a scanning operation using a lens is corrected, or when light quantity ununiformity of a scanning system, which uses a galvanometer mirror or a resonant scanner, is corrected using driving current as in the first to sixth embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-272853 filed Oct. 4, 2006, and Japanese Application No. 2007-216171 filed Aug. 22, 2007, which are hereby incorporated by reference herein in their entirety.

What is claimed is:

1. An image forming apparatus comprising:
    a laser light emitting unit configured to emit laser light on the basis of duty of a pulse signal according to image data and laser driving current, the duty of the pulse signal representing a lighting time of laser light emission during which laser light is continuously emitted;
    a laser driving current controlling unit configured to correct the laser light emission as a result of, to restrict light quantity ununiformity at an image bearing member, continuously changing the laser driving current along a main scanning direction, the light quantity ununiformity occurring when the laser driving current causes the light emission at a constant intensity along the main scanning direction; and
    an adjusting unit configured to adjust the duty of the pulse signal in accordance with information related to an amount of change of the laser driving current by the laser driving current controlling unit.

2. The image forming apparatus according to claim 1, wherein the adjusting unit adjusts the duty of the pulse signal to make a correction in accordance with a difference in a laser light emission characteristic that is in accordance with the laser driving current.

3. The image forming apparatus according to claim 1, wherein, in a case where the laser driving current becomes small as a result of the change by the laser driving current controlling unit, the adjusting unit adjusts the duty of the pulse signal so as to increase the duty of the pulse signal.

4. The image forming apparatus according to claim 1, wherein the adjusting unit adjusts the duty of the pulse signal that is in accordance with the laser driving current and the duty of the pulse signal of the image data that is input.

5. The image forming apparatus according to claim 1, further comprising a controlling device, to which a print image is input from the outside, and an image forming device, to which the image data that the controlling unit outputs on the basis of the print image is input, wherein the adjusting unit is provided at the controlling device.

6. The image forming apparatus according to claim 5, wherein the image forming device includes a notifying unit configured to send each correction laser driving current amount that is provided along the main scanning direction and that is continuously changed, or information indicating each correction laser driving current amount, to the adjusting unit that is provided at the controlling device.

7. The image forming apparatus according to claim 1, further comprising an exposing unit including a rotatable polygonal minor, and configured to form an electrostatic latent image on the image bearing member as a result of reflecting the light from the laser light emitting unit by the rotatable polygonal minor and performing exposing and scanning operations with the light, wherein the adjusting unit corrects the duty of the pulse signal using a correction amount that is in accordance with a main-scanning direction position of the exposing and scanning operation.

8. A controlling method in an image forming apparatus including a laser driving current controlling unit, which changes laser driving current, and a laser light emitting unit, which emits laser light on the basis of duty of a pulse signal according to image data and the laser driving current, the duty of the pulse signal representing a lighting time of laser light emission during which laser light is continuously emitted, the method comprising the steps of:

controlling the laser driving current, in which the laser light emission is corrected as a result of, to restrict light quantity ununiformity at an image bearing member, continuously changing the laser driving current along a main scanning direction, the light quantity ununiformity occurring when the laser driving current causes the light emission at a constant intensity along the main scanning direction; and adjusting the duty of the pulse signal in accordance with information related to an amount of change of the laser driving current by the laser driving current controlling unit.

9. The controlling method according to claim 8, wherein the duty of the pulse signal is adjusted to make a correction in accordance with a difference in a laser light emission characteristic that is in accordance with the laser driving current.

10. The controlling method according to claim 8, wherein the duty of the pulse signal is adjusted to be increased in a case where the laser driving current is changed to become smaller by the laser driving current controlling unit.

* * * * *